United States Patent
Heuvel et al.

(10) Patent No.: US 9,508,195 B2
(45) Date of Patent: Nov. 29, 2016

(54) MANAGEMENT OF CONTENT IN A 3D HOLOGRAPHIC ENVIRONMENT

(71) Applicant: MICROSOFT TECHNOLOGY LICENSING, LLC, Redmond, WA (US)

(72) Inventors: Joseph Van Den Heuvel, Redmond, WA (US); Ken Ouellette, Sammamish, WA (US); Ben Sugden, Redmond, WA (US); Todd Omotani, Redmond, WA (US); Marcus Tanner, Redmond, WA (US); Greg Alt, Seattle, WA (US); Michael Hale, Bellevue, WA (US); Jeff Sutherland, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 57 days.

(21) Appl. No.: 14/476,642

(22) Filed: Sep. 3, 2014

(65) Prior Publication Data
US 2016/0063762 A1   Mar. 3, 2016

(51) Int. Cl.
*G09G 5/00* (2006.01)
*G06T 19/00* (2011.01)
(Continued)

(52) U.S. Cl.
CPC ......... *G06T 19/006* (2013.01); *G02B 27/0093* (2013.01); *G02B 27/0172* (2013.01); *G06F 3/011* (2013.01); *G06F 3/147* (2013.01); *G06K 9/52* (2013.01); *G06T 7/004* (2013.01); *G09G 5/14* (2013.01); *G02B 2027/014* (2013.01); *G02B 2027/0138* (2013.01); *G02B 2027/0178* (2013.01)

(58) Field of Classification Search
CPC ... G06T 19/00; G06T 19/003; G06T 19/006; G06T 7/004; G02B 27/017; G02B 27/0172; G02B 2027/0174; G02B 27/0093; G06F 3/11; G06F 3/147; G06K 9/52; G09G 5/14
See application file for complete search history.

(56) References Cited

U.S. PATENT DOCUMENTS 5,257,094 A * 10/1993 LaRussa ................. G02B 5/32
                                                    359/13
6,346,941 B1 * 2/2002 Arita ....................... G06T 19/00
                                                    345/420

(Continued)

OTHER PUBLICATIONS

Billinghurst et al., wearable devices new ways to manage information, Jan. 1999, IEEE.*

(Continued)

*Primary Examiner* — Devona Faulk
*Assistant Examiner* — Charles L Beard
(74) *Attorney, Agent, or Firm* — Dan Choi; Micky Minhas

(57) ABSTRACT

Methods for managing content within an interactive augmented reality environment are described. An augmented reality environment may be provided to an end user of a head-mounted display device (HMD) in which content (e.g., webpages) may be displayed to the end user using one or more curved slates that are positioned on a virtual cylinder that appears body-locked to the end user. The virtual cylinder may be located around the end user with the end user positioned in the middle of the virtual cylinder such that the one or more curved slates appear to be displayed at the same distance from the end user. The position and size of each of the one or more curved slates may be controlled by the end user using head gestures and a virtual pointer projected onto the virtual cylinder.

19 Claims, 13 Drawing Sheets

(51) Int. Cl.

| | | |
|---|---|---|
| G02B 27/01 | (2006.01) | |
| G06T 7/00 | (2006.01) | |
| G06K 9/52 | (2006.01) | |
| G06F 3/01 | (2006.01) | |
| G09G 5/14 | (2006.01) | |
| G02B 27/00 | (2006.01) | |
| G06F 3/147 | (2006.01) | |

(56) References Cited

U.S. PATENT DOCUMENTS

| | | | | |
|---|---|---|---|---|
| 7,512,902 | B2* | 3/2009 | Robertson | G06F 3/0481 715/782 |
| 8,046,719 | B2* | 10/2011 | Skourup | G06F 3/011 715/757 |
| 8,514,194 | B2 | 8/2013 | Lawrence et al. | |
| 8,532,675 | B1* | 9/2013 | Pasquero | H04M 1/72572 345/158 |
| 8,625,200 | B2* | 1/2014 | Smith | G02B 17/06 345/8 |
| 8,956,227 | B2* | 2/2015 | Suzuki | A63F 13/10 463/30 |
| 9,197,863 | B2* | 11/2015 | Ozaki | H04N 7/18 |
| 9,335,547 | B2* | 5/2016 | Takano | G06F 3/005 |
| 2002/0170193 | A1* | 11/2002 | Townsend | A61B 5/1116 33/512 |
| 2003/0167466 | A1* | 9/2003 | Nakamura | G06T 19/00 725/39 |
| 2003/0201992 | A1* | 10/2003 | Wang | G06F 3/04845 345/420 |
| 2004/0080548 | A1* | 4/2004 | Daily | G06F 3/0346 715/850 |
| 2005/0253870 | A1* | 11/2005 | Kotake | G06T 7/0042 345/633 |
| 2006/0238534 | A1* | 10/2006 | Matsumoto | G06T 15/08 345/420 |
| 2006/0284792 | A1* | 12/2006 | Foxlin | G02B 27/017 345/8 |
| 2007/0262986 | A1* | 11/2007 | Suzuki | A63F 13/10 345/421 |
| 2008/0005702 | A1* | 1/2008 | Skourup | G06F 3/011 715/848 |
| 2008/0024523 | A1* | 1/2008 | Tomite | G06T 15/50 345/632 |
| 2008/0218515 | A1* | 9/2008 | Fukushima | H04N 13/0404 345/424 |
| 2008/0291217 | A1* | 11/2008 | Vincent | G06T 17/05 345/629 |
| 2009/0189974 | A1* | 7/2009 | Deering | G09G 3/02 348/46 |
| 2009/0237403 | A1* | 9/2009 | Horii | G06N 3/006 345/427 |
| 2010/0045571 | A1* | 2/2010 | Yamamoto | G02B 27/0172 345/8 |
| 2010/0328344 | A1* | 12/2010 | Mattila | G06F 1/1626 345/633 |
| 2011/0018867 | A1* | 1/2011 | Shibamiya | G06F 3/011 345/419 |
| 2011/0018868 | A1* | 1/2011 | Inoue | H04N 13/0278 345/419 |
| 2011/0080336 | A1* | 4/2011 | Leyvand | A63F 13/06 345/156 |
| 2011/0096089 | A1* | 4/2011 | Shenhav | G06F 3/04815 345/619 |
| 2011/0242090 | A1* | 10/2011 | Keating | G06F 3/011 345/419 |
| 2011/0254916 | A1* | 10/2011 | Fan | G02B 27/2278 348/41 |
| 2011/0306397 | A1* | 12/2011 | Fleming | A63F 13/10 463/7 |
| 2012/0021806 | A1* | 1/2012 | Maltz | H04W 4/20 455/566 |
| 2012/0032958 | A1* | 2/2012 | Werline | G06T 19/20 345/420 |
| 2012/0086793 | A1* | 4/2012 | Anabuki | H04N 7/144 348/77 |
| 2012/0120498 | A1* | 5/2012 | Harrison | G02B 3/08 359/630 |
| 2012/0120499 | A1* | 5/2012 | Harrison | G02B 17/06 359/631 |
| 2012/0127284 | A1* | 5/2012 | Bar-Zeev | G02B 27/017 348/53 |
| 2012/0306933 | A1* | 12/2012 | Osako | A63F 13/10 345/672 |
| 2013/0009994 | A1* | 1/2013 | Hill | G06N 3/006 345/633 |
| 2013/0050432 | A1* | 2/2013 | Perez | H04N 13/0278 348/47 |
| 2013/0071012 | A1* | 3/2013 | Leichsenring | G06K 9/80 382/154 |
| 2013/0095924 | A1* | 4/2013 | Geisner | A63F 13/00 463/32 |
| 2013/0162632 | A1* | 6/2013 | Varga | G06T 19/006 345/419 |
| 2013/0246967 | A1* | 9/2013 | Wheeler | G06F 3/012 715/784 |
| 2013/0261410 | A1* | 10/2013 | Davenport | A61B 5/073 600/302 |
| 2013/0301090 | A1 | 11/2013 | Flynn et al. | |
| 2014/0002439 | A1* | 1/2014 | Lynch | G09B 29/007 345/419 |
| 2014/0028539 | A1* | 1/2014 | Newham | G06F 1/1694 345/156 |
| 2014/0055490 | A1* | 2/2014 | Mul | G06T 11/80 345/633 |
| 2014/0125579 | A1* | 5/2014 | Yamamoto | G02B 27/017 345/156 |
| 2014/0125698 | A1* | 5/2014 | Latta | G06F 3/011 345/633 |
| 2014/0270351 | A1* | 9/2014 | Hoof | G06T 7/2086 382/103 |
| 2014/0285429 | A1* | 9/2014 | Simmons | G02B 27/225 345/156 |
| 2014/0327792 | A1* | 11/2014 | Mulloni | G06T 7/0042 348/211.8 |
| 2014/0347390 | A1* | 11/2014 | Poulos | G06T 19/006 345/633 |
| 2014/0347391 | A1* | 11/2014 | Keane | G06T 19/006 345/633 |
| 2014/0368426 | A1* | 12/2014 | Umehara | G06F 3/01 345/156 |
| 2015/0049002 | A1* | 2/2015 | Ishikawa | G02B 27/0093 345/8 |
| 2015/0049004 | A1* | 2/2015 | Deering | G02B 27/0172 345/8 |
| 2015/0301592 | A1* | 10/2015 | Miller | G06F 3/011 345/156 |
| 2015/0323990 | A1* | 11/2015 | Maltz | H04N 7/14 345/173 |
| 2016/0027213 | A1* | 1/2016 | Burns | G06T 7/0042 345/633 |
| 2016/0086306 | A1* | 3/2016 | Nishimaki | G06T 3/40 345/620 |
| 2016/0171777 | A1* | 6/2016 | Todeschini | G06T 19/006 345/633 |

OTHER PUBLICATIONS

Billinghurst et al., an evaluation of wearable information spaces, Mar. 1998, University of Washington.*
Response to International Search Report & Written Opinion, dated Jan. 13, 2016, PCT Application No. PCT/US2015/047631.
International Preliminary Report on Patentability Issued in PCT Application No. PCT/US2015/047631, Mailed Date: Jul. 25, 2016, 7 Pages.

* cited by examiner

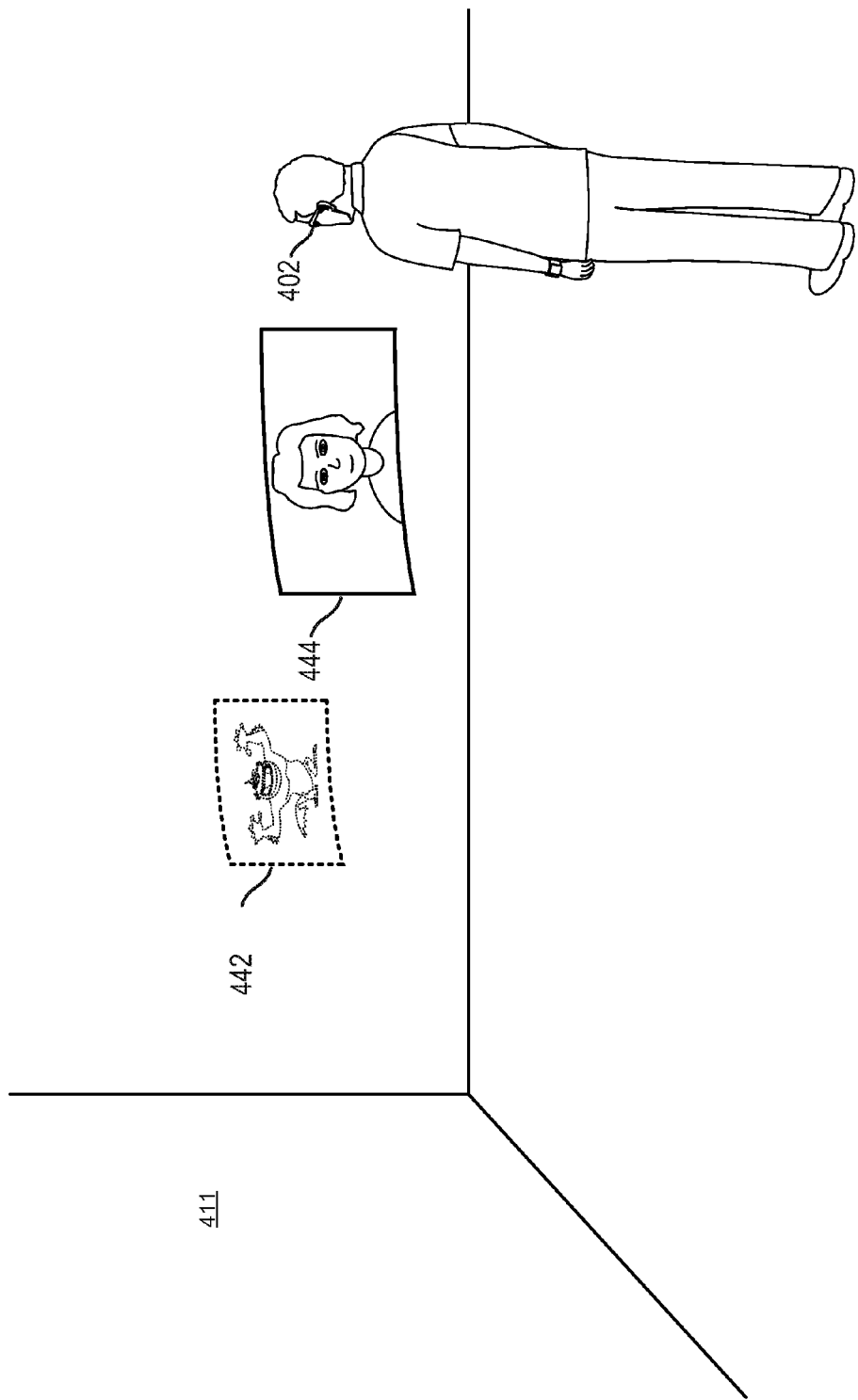

MANAGEMENT OF CONTENT IN A 3D HOLOGRAPHIC ENVIRONMENT

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system may perform several tasks including mapping and localization. Mapping relates to the process of generating a map of a real-world environment. Localization relates to the process of locating a particular point of view or pose relative to the map of the real-world environment. In some cases, an AR system may localize the pose of a mobile device moving within a real-world environment in real-time in order to determine the particular view associated with the mobile device to be augmented as the mobile device moves within the real-world environment.

SUMMARY

Technology is described for enabling an interactive augmented reality environment in which content may be displayed and managed. In some embodiments, an augmented reality environment may be provided to an end user of a head-mounted display device (HMD) in which content (e.g., two-dimensional image or textual content) may be displayed to the end user using one or more curved slates that are positioned on a virtual cylinder that appears body-locked to the end user. The virtual cylinder may be located around the end user with the end user positioned in the middle of the virtual cylinder (e.g., the axis of the virtual cylinder may be located perpendicular to the ground and extend through the end user's head) such that the one or more curved slates appear to be displayed at the same distance from the end user. The content selected for display on each of the one or more curved slates and the position and/or size of each of the one or more curved slates may be controlled by the end user using gestures (e.g., hand gestures or head gestures) and a virtual pointer projected onto the virtual cylinder. In one example, a virtual pointer may appear to be head-locked and controlled by the end user using head movements and the virtual cylinder may appear to be body-locked to the end user's body.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4E depicts one embodiment of an augmented reality environment as viewed by an end user of an HMD.

DETAILED DESCRIPTION

Figure 1:
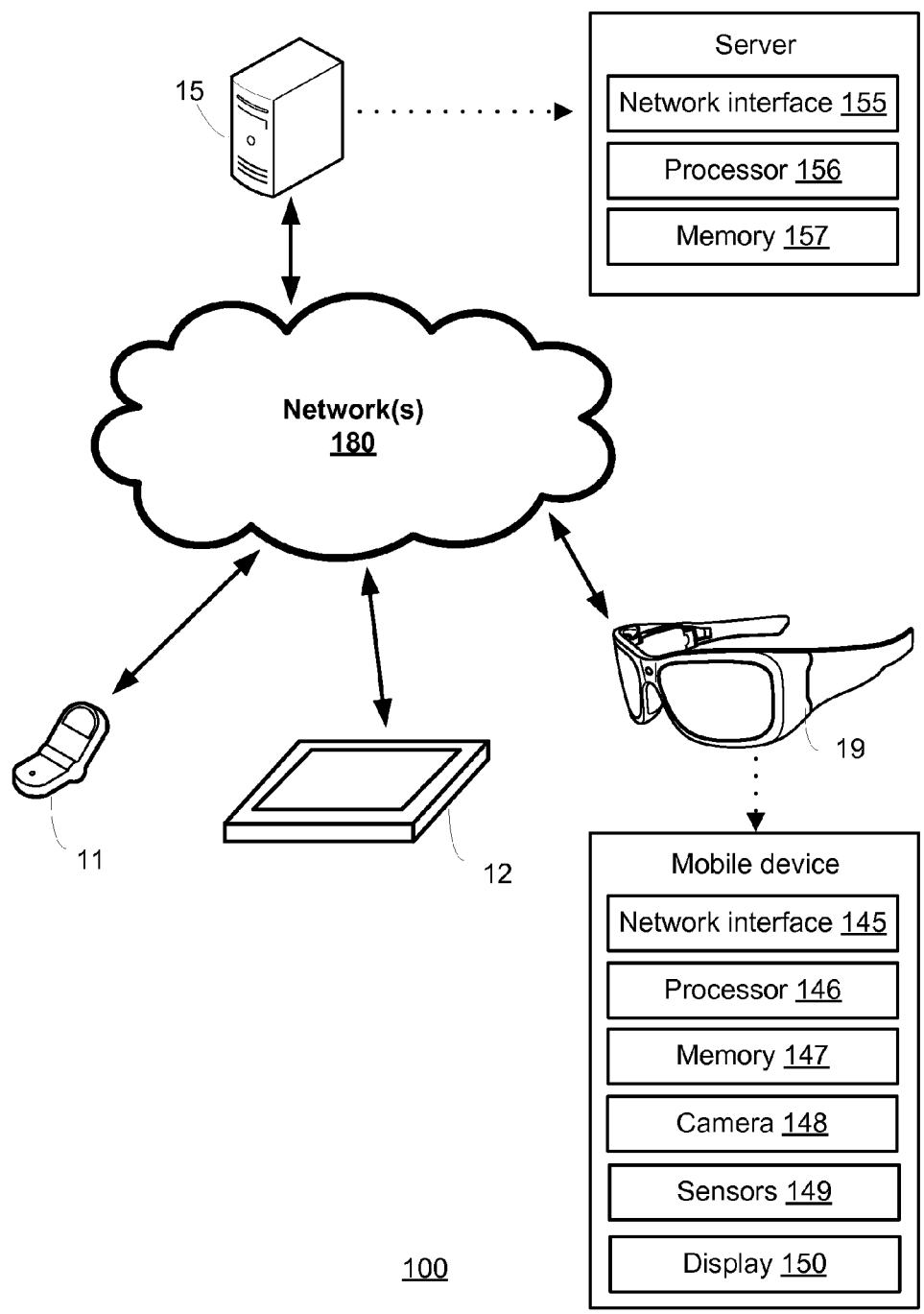
FIG. 1 is a block diagram of one embodiment of a networked computing environment in which the disclosed technology may be practiced.

Technology is described for displaying and managing content within an interactive augmented reality environment. In some embodiments, an augmented reality environment may be provided to an end user of a head-mounted display device (HMD) in which content (e.g., webpages, videos, and text) may be displayed to the end user using one or more curved slates (or one or more curved surfaces) that are positioned on a virtual cylinder that appears body-locked to the end user. The virtual cylinder may be located around the end user with the end user positioned in the middle of the virtual cylinder (e.g., the axis of the virtual cylinder may be located perpendicular to the ground and extend through the end user's torso and head) such that the one or more curved slates appear to be displayed at the same distance from the end user (e.g., the one or more curved slates may be positioned on a virtual cylinder with a one meter radius). The content selected for display on each of the one or more curved slates and the position and/or size of each of the one or more curved slates may be controlled by the end user using gestures (e.g., hand gestures or head gestures) and a virtual pointer projected onto the virtual cylinder. In one example, a virtual pointer may appear to be head-locked and controlled by the end user using head movements, while the virtual cylinder appears to be body-locked to the end user's body.

In some cases, an HMD may project one or more curved slates that are arranged on an invisible cylinder located around an end user of the HMD. Each of the one or more curved slates may display content (e.g., images, text, videos, live video feeds, or webpage content) or provide access to a computing application (e.g., an email application, a word processing application, a web browser application, a web-based application, or an instant messaging application). In some cases, rather than being arranged around a cylinder surrounding the end user, the one or more curved slates may be arranged on a sphere, a cone, or another 3D shape with curved surfaces that may surround the end user. In some embodiments, the one or more curved slates may be arranged around a virtual cylinder and appear body-locked relative to a portion of the end user's body. In one example, the one or more curved slates may be body-locked relative to the portion of the end user's body such that the orientation and position of the one or more curved slates arranged on the cylinder appear fixed relative to the portion of the end user's body (e.g., a curved slate may appear to have a fixed position in front of the end user's chest or torso).

In some embodiments, an end user of an HMD may move or control the position of a curved slate along the surface of a virtual cylinder surrounding the end user using head gestures, hand gestures, and/or voice commands. In one example, the end user may control a virtual pointer that is projected onto the virtual cylinder in order to select the curved slate. The virtual pointer may appear as a virtual laser pointer or as virtual crosshairs to the end user of the HMD. Once the curved slate has been selected (e.g., via a voice command or hovering the virtual pointer over the curved slate for at least a threshold period of time), then the end user may move the curved slate using additional head gestures or head movements. In some cases, the virtual pointer may be controlled by the end user using gaze detection techniques (e.g., the end user may control the virtual pointer by gazing at a region of the virtual cylinder for at least a particular period of time in order to move the virtual pointer to that region of the virtual cylinder). In another example, the end user may control a curved slate by virtual grabbing the curved slate using a hand gesture (e.g., using an open hand to closed first gesture), moving the curved slate (e.g., while maintaining a closed first gesture), and then releasing the curved slate in a new position within the virtual cylinder (e.g., by using a closed first to open hand gesture). In one embodiment, as the end user moves the selected curved slate around the surface of the virtual cylinder, other non-selected curved slates may be displaced or otherwise moved away from their current position in order to make room for the selected curved slate. In one example, the other non-selected curved slates may be pushed back or rotated away from view while the selected curved slate passes over the other non-selected curved slates.

In one embodiment, a curved slate (or a curved display construct) may be moved around a cylindrical work area surrounding an end user of an HMD. The curved slate may be partitioned into a first number of grid pieces associated with a grid layout of the cylindrical work area (e.g., a curved slate may be partitioned into nine grid pieces). The edges of the curved slate may align with or snap to the edges of the grid layout of the cylindrical work area. The cylindrical work area may be partition into a second number of grid pieces associated with the grid layout (e.g., a cylindrical work area may be partitioned into 1000 grid pieces). As the curved slate is stretched or resized within the cylindrical work area, the curved slate may grow to include a greater number of grid pieces of the cylindrical work area than the first number of grid pieces (e.g., the curved slate may grow from nine grid pieces to consume 25 grid pieces of the cylindrical work area). The curved slate may be expanded in a horizontal manner and/or a vertical manner by dragging or moving the edges or corners of the curved slate. In one embodiment, moving and releasing the curved slate within the cylindrical work area may cause the curved slate to snap to or align with the edges of other non-selected curved slates. In this case, the curved slate may have a magnetic snapping function that aligns the curved slate with the edges of one or more other non-selected curved slates when the curved slate is released by the end user.

In some embodiments, an augmented reality environment may be provided to an end user of an HMD in which content may be displayed to the end user using one or more curved slates that are positioned on two or more virtual cylinders that appear body-locked to the end user. Each of the two or more virtual cylinders may have a different radius than the other virtual cylinders (e.g., a primary cylinder may have a radius of one meter, while a secondary cylinder may have a radius of three meters). In some cases, two virtual cylinders may have the same radius, but be arranged at different heights around the end user. In one embodiment, a first cylinder of a first radius extending from the end user may be associated with a work environment and include work-related content (e.g., an email reader, a word processing document, a video, or a live meeting feed) and a second cylinder of a second radius extending from the end user may be associated with a home environment and include personal content (e.g., a television show or movie, webpages associated with sporting events, a search engine interface, or an instant messaging client). The second radius may be different from the first radius (e.g., the first radius may be three feet and the second radius may be nine feet). In one example, the radius of a virtual cylinder may be automatically adjusted based on an environment in which the end user exists. In one example, the first radius may be set to one meter when the end user is in a fixed location within a work environment (e.g., sitting down at a desk or being located within a building associated with the work environment) and adjust to three meters when the end user is moving around within a home environment. In another example, when the end user is located outside of a work environment (e.g., per GPS coordinates the end user is determined to be located outside of a geographic location associated with the work environment), then the second cylinder may comprise a primary cylinder and be assigned the smallest radius out of two or more virtual cylinders surrounding the end user; when the end user moves inside the work environment, then the first cylinder may comprise the primary cylinder and be assigned the smallest radius out of the two or more virtual cylinders surrounding the end user. The curved slates located on virtual cylinders other than the primary cylinder may be made partially transparent or shaded in order to make viewing of content displayed by curved slates located on the primary cylinder easier to view. If a virtual cylinder does not fit within an environment, then curved slates associated with that cylinder may not be displayed to the end user.

One benefit of managing content and applications using curved slates that are positioned on one or more virtual cylinders that are body-locked to an end user of a mobile device and surround the end user is that less space and less energy may be required to provide the end user with access to the content and applications. For example, an HMD may project numerous computing applications to the end user and allow the end user to interact with the numerous computing applications without requiring additional computer monitors or screens. Therefore, the electronic devices typically found on a work desk, such as one or more computer monitors, may be replaced with a lower power and smaller form factor HMD worn by the end user. Moreover, the ability to access and control large amounts of content using one or more virtual cylinders surrounding the end user and the dynamic assignment of curved slates to the one or more virtual cylinders based on an end user's environment or location provides a user interface with improved functionality and improved user efficiency.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, and memory 157, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images of an environment. The mobile device 19 may include outward facing cameras that capture images of the environment and inward facing cameras that capture images of the end user of the mobile device. Sensors 149 may generate motion and/or orientation information associated with mobile device 19. In some cases, sensors 149 may comprise an inertial measurement unit (IMU). Display 150 may display digital images and/or videos. Display 150 may comprise a see-through display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may detect that a person has performed a particular gesture in order to control the computing device.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment to an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user may change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

In some embodiments, a mobile device, such as mobile device 19, may comprise an HMD that provides an augmented reality environment including a virtual content reader. The virtual content reader may comprise a virtual object within the augmented reality environment in which content may be read by an end user of the HMD. In one embodiment, the virtual content reader may comprise a virtual object that appears fixed with respect to the end user's point of view (i.e., a head-locked virtual object). For example, the virtual content reader may appear in the top left corner of the end user's point of view regardless of how the end user turns their head. In another embodiment, the virtual content reader may comprise a virtual object that appears to maintain a coherent spatial relationship within the augmented reality environment (i.e., a world-locked virtual object). For example, as the end user turns their head or moves within the augmented reality environment, the images displayed to the end user on the HMD may change such that the virtual content reader appears to exist within the augmented reality environment at a particular location (e.g., on a wall).

In some embodiments, a mobile device, such as mobile device 19, may comprise an HMD that provides an augmented reality environment in which content and applications may be displayed to an end user of the HMD using one or more curved slates that are positioned on a virtual cylinder that appears body-locked with respect to the end user. A virtual curved slate may comprise a virtual object that appears to be fixed with respect to an orientation of the end user's body within the augmented reality environment (i.e., a body-locked virtual object). In one example, as the end user turns their head or moves within the augmented reality environment, the images displayed to the end user on the HMD may change such that the virtual curved slate appears to exist within the augmented reality environment at a location that is fixed relative to an orientation of the end user's body (e.g., the virtual curved slate may appear to be located two meters in front of the end user's chest regardless of how the end user moves their head or moves within the augmented reality environment). In another example, as the end user turns their head or moves within the augmented reality environment, the images displayed to the end user on the HMD may change such that a virtual curved slate may appear to be arranged on a portion of a virtual cylinder that surrounds an end user of an HMD. The virtual cylinder may be located around the end user with the end user positioned in the middle of the virtual cylinder (e.g., the axis of the virtual cylinder may extend vertically through the end user's torso and head) and the virtual cylinder may appear to be oriented such that a first line that is parallel to the axis of the virtual cylinder and lies within the virtual cylinder appears to be fixed relative to an orientation of the end user's body (e.g., the first line may be located four meters in front of the end user's chest regardless of how the end user moves their head or moves within the augmented reality environment).

Figure 2A:
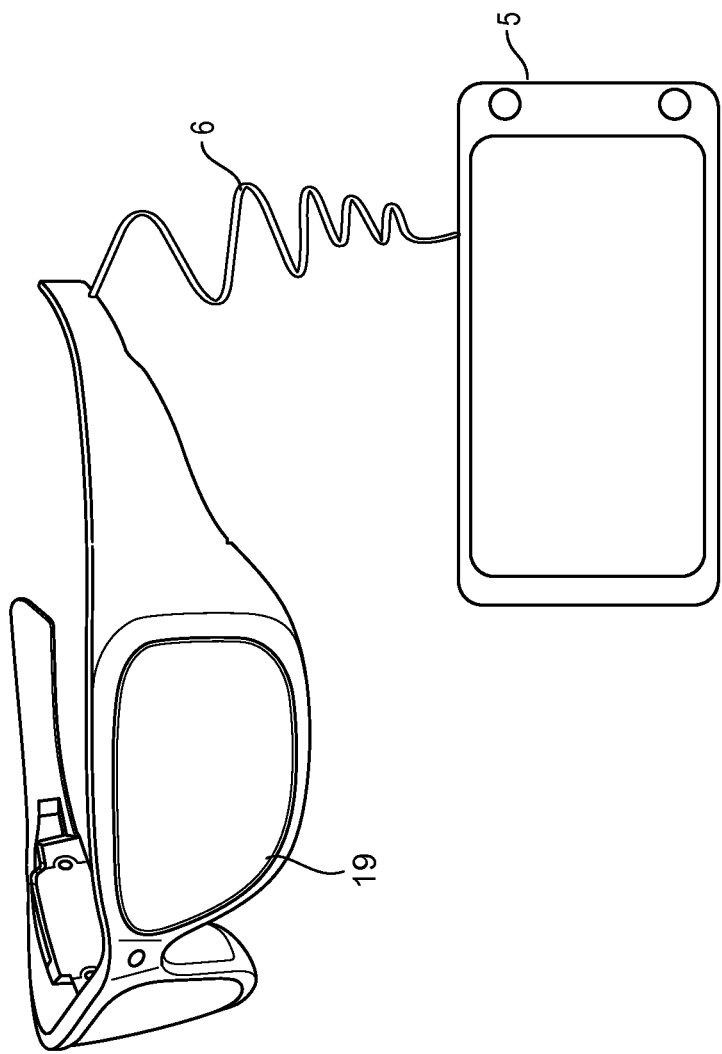
FIG. 2A depicts one embodiment of a mobile device in communication with a second mobile device.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. Mobile device 5 may be used by mobile device 19 in order to offload compute intensive processing tasks (e.g., the rendering of virtual objects) and to store virtual object information and other data that may be used to provide an augmented reality environment on mobile device 19. Mobile device 5 may also provide motion and/or orientation information associated with mobile device 5 to mobile device 19. In one example, the motion information may include a velocity or acceleration associated with the mobile device 5 and the orientation information may include Euler angles, which provide rotational information around a particular coordinate system or frame of reference. In some cases, mobile device 5 may include a motion and orientation sensor, such as an inertial measurement unit (IMU), in order to acquire motion and/or orientation information associated with mobile device 5. The IMU may include a tri-axial accelerometer, a tri-axial gyro, and a tri-axial magnetic sensor. The mobile device 5 may determine an inertial frame using the IMU. The inertial reference frame may include an x-axis pointing North, a y-axis pointing East, and a z-axis pointing down towards the Earth.

In one embodiment, a mobile device, such as mobile device 5, may be positioned such that an orientation of the mobile device is held fixed (or substantially fixed) relative to the body of an end user of the mobile device. In one example, the mobile device may be positioned within a back pocket of pants or shorts worn by the end user. In another example, the mobile device may be positioned within a front pocket of a shirt or jacket worn by the end user. In another example, the mobile device may be strapped or clipped to a belt worn around the end user's waist. In these cases, an orientation of the mobile device relative to the end user's body may be determined using accelerometer and magnetometer data generated by the mobile device. The mobile device may generate a gravity vector or a vector that is orthogonal to a surface of the Earth based on the accelerometer and magnetometer data. The gravity vector may correspond with a vector that points towards the ground from a point on the mobile device. In one embodiment, an axis of a virtual cylinder may correspond with the gravity vector. The axis may correspond with a line that intersects the mobile device and is parallel to the gravity vector. The mobile device may also generate a North vector or a vector that is orthogonal to the gravity vector and points in a northern direction based on the accelerometer and magnetometer data. In some cases, during a calibration step, the mobile device may determine a front facing vector by asking the end user to face North and align the front of their body with the North vector. The front facing vector may then move relative to a North-East-Down (NED) reference frame generated by the mobile device.

Figure 2B:
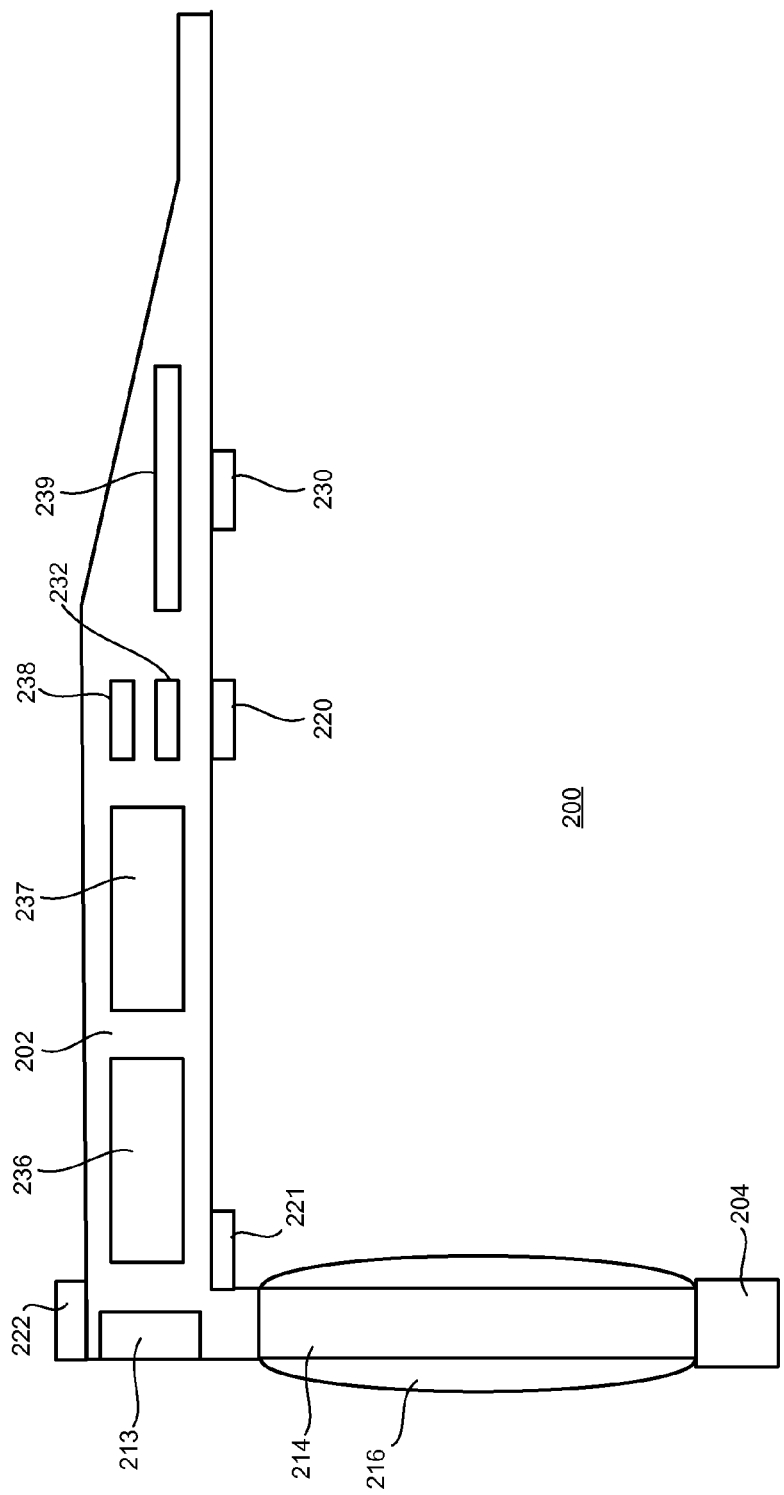
FIG. 2B depicts one embodiment of a portion of an HMD.

FIG. 2B depicts one embodiment of a portion of an HMD, such as mobile device 19 in FIG. 1. Only the right side of an HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, body facing camera 222, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include one or more inward facing cameras. The one or more inward facing cameras may capture images of an eye of an end user of the HMD. In another embodiment, the eye tracking system 221 may comprise an eye tracking illumination source and an associated eye tracking image sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011.

In one embodiment, the body facing camera 222 may include one or more downward facing cameras. The one or more downward facing cameras may capture images of a portion of a body of an end user of the HMD. For example, the one or more downward facing cameras may capture images of the end user's torso, chest, abdomen, or pelvic region. The images of the end user's body may be used to determine an orientation of the end user's body relative to the HMD. In one example, image processing techniques may be applied to the images of the end user's body to determine a direction that the end user's torso is facing relative to the HMD.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 2C:
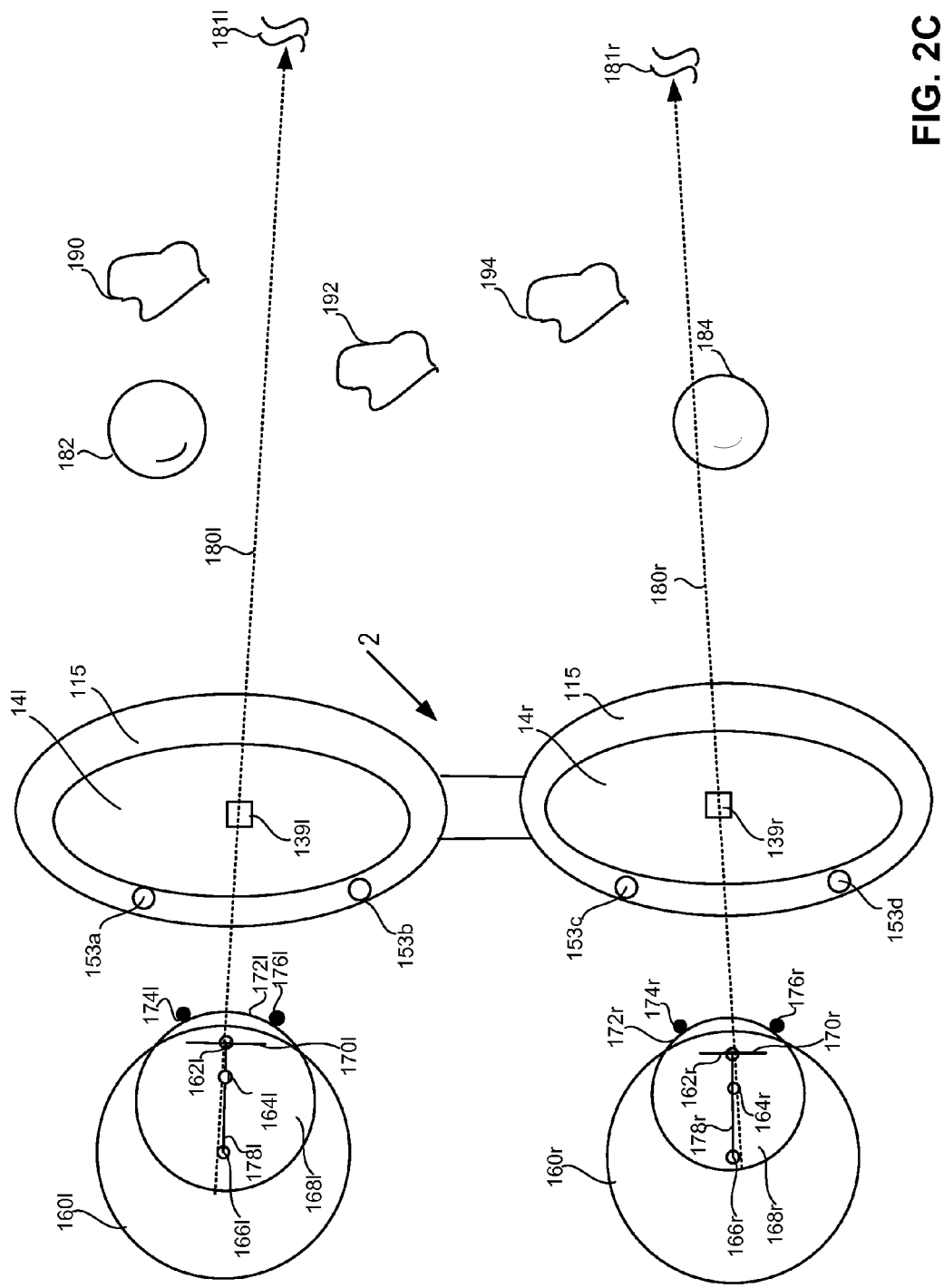
FIG. 2C depicts one embodiment of a portion of an HMD in which gaze vectors extending to a point of gaze are used for aligning a far inter-pupillary distance (IPD).

FIG. 2C depicts one embodiment of a portion of an HMD 2 in which gaze vectors extending to a point of gaze are used for aligning a far inter-pupillary distance (IPD). HMD 2 is one example of a mobile device, such as mobile device 19 in FIG. 1. As depicted, gaze vectors 180*l* and 180*r* intersect at a point of gaze that is far away from the end user (i.e., the gaze vectors 180*l* and 180*r* do not intersect as the end user is looking at an object far away). A model of the eyeball for eyeballs 160*l* and 160*r* is illustrated for each eye based on the Gullstrand schematic eye model. Each eyeball is modeled as a sphere with a center of rotation 166 and includes a cornea 168 modeled as a sphere having a center 164. The cornea 168 rotates with the eyeball, and the center of rotation 166 of the eyeball may be treated as a fixed point. The cornea 168 covers an iris 170 with a pupil 162 at its center. On the surface 172 of each cornea are glints 174 and 176.

As depicted in FIG. 2C, a sensor detection area 139 (i.e., 139*l* and 139*r*, respectively) is aligned with the optical axis of each display optical system 14 within an eyeglass frame 115. In one example, the sensor associated with the detection area may include one or more cameras capable of capturing image data representing glints 174*l* and 176*l* generated respectively by illuminators 153*a* and 153*b* on the left side of the frame 115 and data representing glints 174*r* and 176*r* generated respectively by illuminators 153*c* and 153*d* on the right side of the frame 115. Through the display optical systems 14*l* and 14*r* in the eyeglass frame 115, the end user's field of view includes both real objects 190, 192, and 194 and virtual objects 182 and 184.

The axis 178 formed from the center of rotation 166 through the cornea center 164 to the pupil 162 comprises the optical axis of the eye. A gaze vector 180 may also be referred to as the line of sight or visual axis which extends from the fovea through the center of the pupil 162. In some embodiments, the optical axis is determined and a small correction is determined through user calibration to obtain the visual axis which is selected as the gaze vector. For each end user, a virtual object may be displayed by the display device at each of a number of predetermined positions at different horizontal and vertical positions. An optical axis may be computed for each eye during display of the object at each position, and a ray modeled as extending from the position into the user's eye. A gaze offset angle with horizontal and vertical components may be determined based on how the optical axis must be moved to align with the modeled ray. From the different positions, an average gaze offset angle with horizontal or vertical components can be selected as the small correction to be applied to each computed optical axis. In some embodiments, only a horizontal component is used for the gaze offset angle correction.

As depicted in FIG. 2C, the gaze vectors 180*l* and 180*r* are not perfectly parallel as the vectors become closer together as they extend from the eyeball into the field of view at a point of gaze. At each display optical system 14, the gaze vector 180 appears to intersect the optical axis upon which the sensor detection area 139 is centered. In this configuration, the optical axes are aligned with the inter-pupillary distance (IPD). When an end user is looking straight ahead, the IPD measured is also referred to as the far IPD.

Figure 2D:
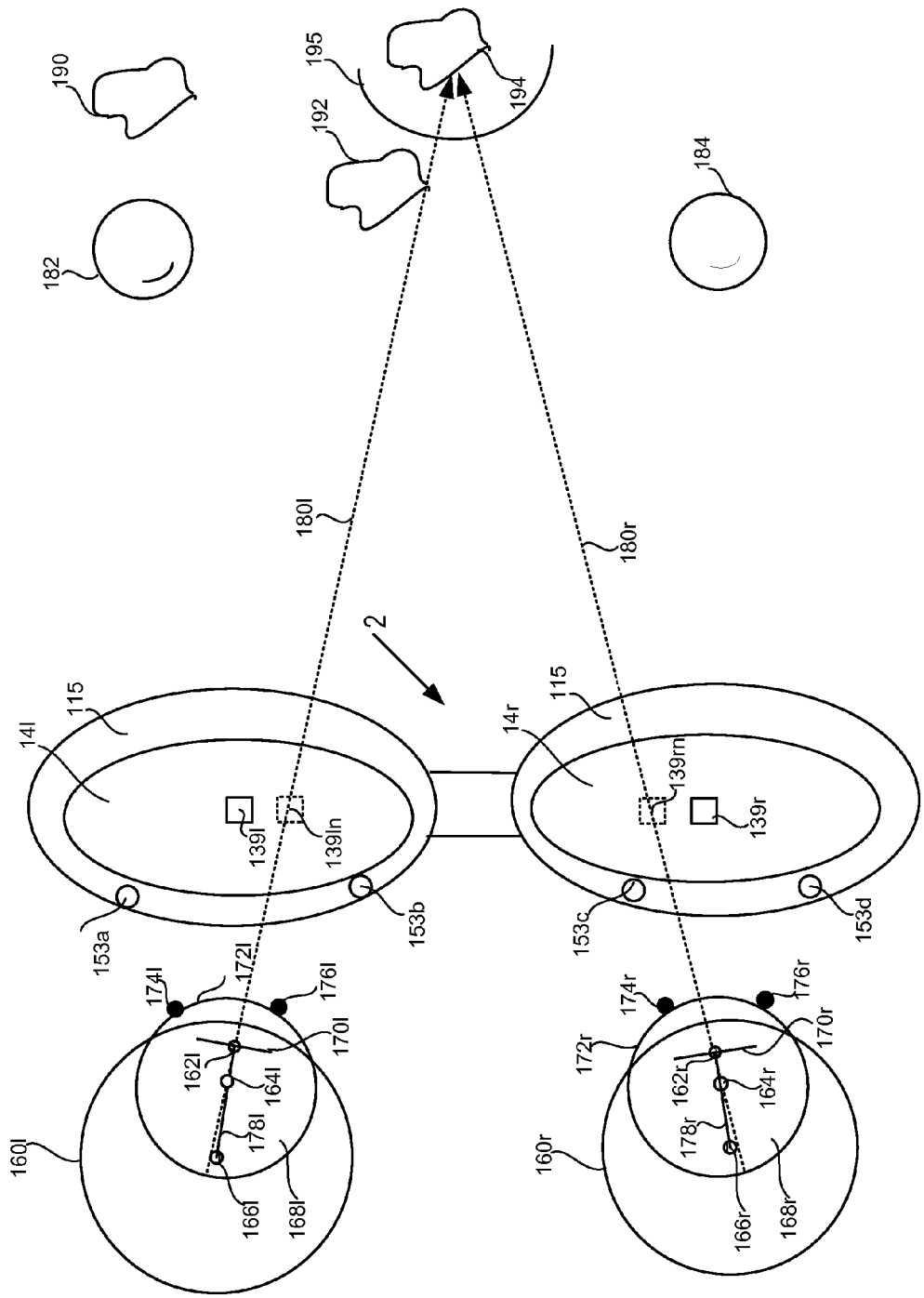
FIG. 2D depicts one embodiment of a portion of an HMD in which gaze vectors extending to a point of gaze are used for aligning a near inter-pupillary distance (IPD).

FIG. 2D depicts one embodiment of a portion of an HMD 2 in which gaze vectors extending to a point of gaze are used for aligning a near inter-pupillary distance (IPD). HMD 2 is one example of a mobile device, such as mobile device 19 in FIG. 1. As depicted, the cornea 168*l* of the left eye is rotated to the right or towards the end user's nose, and the cornea 168*r* of the right eye is rotated to the left or towards the end user's nose. Both pupils are gazing at a real object 194 within a particular distance of the end user. Gaze vectors 180*l* and 180*r* from each eye enter the Panum's fusional region 195 in which real object 194 is located. The Panum's fusional region is the area of single vision in a binocular viewing system like that of human vision. The intersection of the gaze vectors 180*l* and 180*r* indicates that the end user is looking at real object 194. At such a distance, as the eyeballs rotate inward, the distance between their pupils decreases to a near IPD. The near IPD is typically about 4 mm less than the far IPD. A near IPD distance criteria (e.g., a point of gaze at less than four feet from the end user) may be used to switch or adjust the IPD alignment of the display optical systems 14 to that of the near IPD. For the near IPD, each display optical system 14 may be moved toward the end user's nose so the optical axis, and detection area 139, moves toward the nose a few millimeters as represented by detection areas 139*ln* and 139*rn*. More information about determining the IPD for an end user of an HMD and adjusting the display optical systems accordingly can be found in U.S. patent application Ser. No. 13/250,878, entitled "Personal Audio/Visual System," filed Sep. 30, 2011.

Figure 3A:
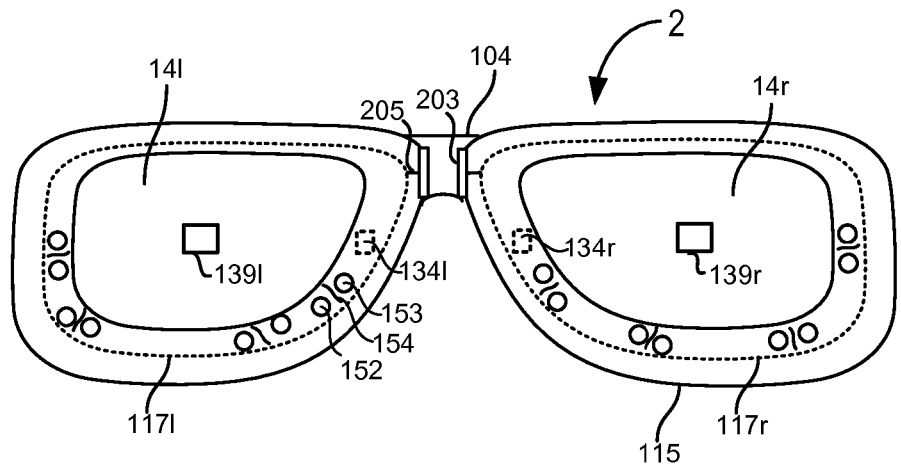
FIG. 3A depicts one embodiment of a portion of an HMD with movable display optical systems including gaze detection elements.

FIG. 3A depicts one embodiment of a portion of an HMD 2 with movable display optical systems including gaze detection elements. What appears as a lens for each eye represents a display optical system 14 for each eye (i.e., 14*l* and 14*r*). A display optical system includes a see-through lens and optical elements (e.g. mirrors, filters) for seamlessly fusing virtual content with the actual direct real world view seen through the lenses of the HMD. A display optical system 14 has an optical axis which is generally in the center of the see-through lens in which light is generally collimated to provide a distortionless view. For example, when an eye care professional fits an ordinary pair of eyeglasses to an end user's face, the glasses are usually fit such that they sit on the end user's nose at a position where each pupil is aligned with the center or optical axis of the respective lens resulting in generally collimated light reaching the end user's eye for a clear or distortionless view.

As depicted in FIG. 3A, a detection area 139*r*, 139*l* of at least one sensor is aligned with the optical axis of its respective display optical system 14*r*, 14*l* so that the center of the detection area 139*r*, 139*l* is capturing light along the optical axis. If the display optical system 14 is aligned with the end user's pupil, then each detection area 139 of the respective sensor 134 is aligned with the end user's pupil. Reflected light of the detection area 139 is transferred via one or more optical elements to the actual image sensor 134 of the camera, which in the embodiment depicted is illustrated by the dashed line as being inside the frame 115. In some embodiments, the sensor 134 may comprise an image sensor or RGB camera for capturing images of an end user's eyes or facial features surrounding the eyes. Other inward facing image sensors may also be integrated with the frame 115 in order to capture fixed facial features associated with the end user such as their nasal bridge.

In one embodiment, the at least one sensor 134 may be a visible light camera (e.g., an RGB or color camera). In one example, an optical element or light directing element comprises a visible light reflecting mirror which is partially transmissive and partially reflective. The visible light camera provides image data of the pupil of the end user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera may not be sensitive to the virtual image reflections on the eye.

In another embodiment, the at least one sensor 134 (i.e., 134*l* and 134*r*) is an IR camera or a position sensitive detector (PSD) to which the IR radiation may be directed. The IR radiation reflected from the eye may be from incident radiation of the illuminators 153, other IR illuminators (not shown), or from ambient IR radiation reflected off the eye. In some cases, sensor 134 may be a combination of an RGB and an IR camera, and the light directing elements may include a visible light reflecting or diverting element and an IR radiation reflecting or diverting element. In some cases, the sensor 134 may be embedded within a lens of the system 14. Additionally, an image filtering technique may be applied to blend the camera into a user field of view to lessen any distraction to the user.

As depicted in FIG. 3A, there are four sets of an illuminator 153 paired with a photodetector 152 and separated by a barrier 154 to avoid interference between the incident light generated by the illuminator 153 and the reflected light received at the photodetector 152. To avoid unnecessary clutter in the drawings, drawing numerals are shown with respect to a representative pair. Each illuminator may be an infra-red (IR) illuminator which generates a narrow beam of light at about a predetermined wavelength. Each of the photodetectors may be selected to capture light at about the predetermined wavelength. Infra-red may also include near-infrared. As there can be wavelength drift of an illuminator or photodetector or a small range about a wavelength may be acceptable, the illuminator and photodetector may have a tolerance range about a wavelength for generation and detection. In some embodiments where the sensor is an IR camera or IR position sensitive detector (PSD), the photodetectors may include additional data capture devices and may also be used to monitor the operation of the illuminators, e.g. wavelength drift, beam width changes, etc. The photodetectors may also provide glint data with a visible light camera as the sensor 134.

As depicted in FIG. 3A, each display optical system 14 and its arrangement of gaze detection elements facing each eye (e.g., such as camera 134 and its detection area 139, the illuminators 153, and photodetectors 152) are located on a movable inner frame portion 117*l*, 117*r*. In this example, a display adjustment mechanism comprises one or more motors 203 having a shaft 205 which attaches to the inner frame portion 117 which slides from left to right or vice versa within the frame 115 under the guidance and power of shafts 205 driven by motors 203. In some embodiments, one motor 203 may drive both inner frames.

Figure 3B:
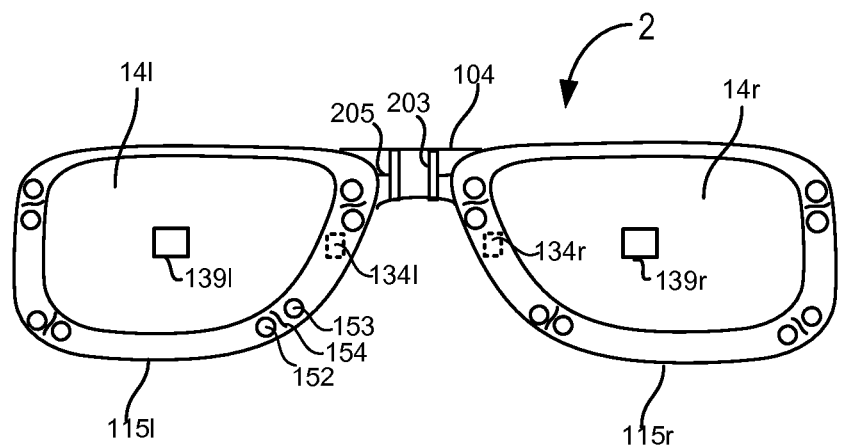
FIG. 3B depicts an alternative embodiment of a portion of an HMD with movable display optical systems including gaze detection elements.

FIG. 3B depicts an alternative embodiment of a portion of an HMD 2 with movable display optical systems including gaze detection elements. As depicted, each display optical system 14 is enclosed in a separate frame portion 115*l*, 115*r*. Each of the frame portions may be moved separately by the motors 203. In some embodiments, the at least one sensor 134 may comprise an image sensor or RGB camera for capturing images of an end user's eyes or facial features surrounding the eyes. Other inward facing image sensors may be integrated with the frame 115 in order to capture fixed facial features associated with the end user such as their nasal bridge.

Figure 4A:
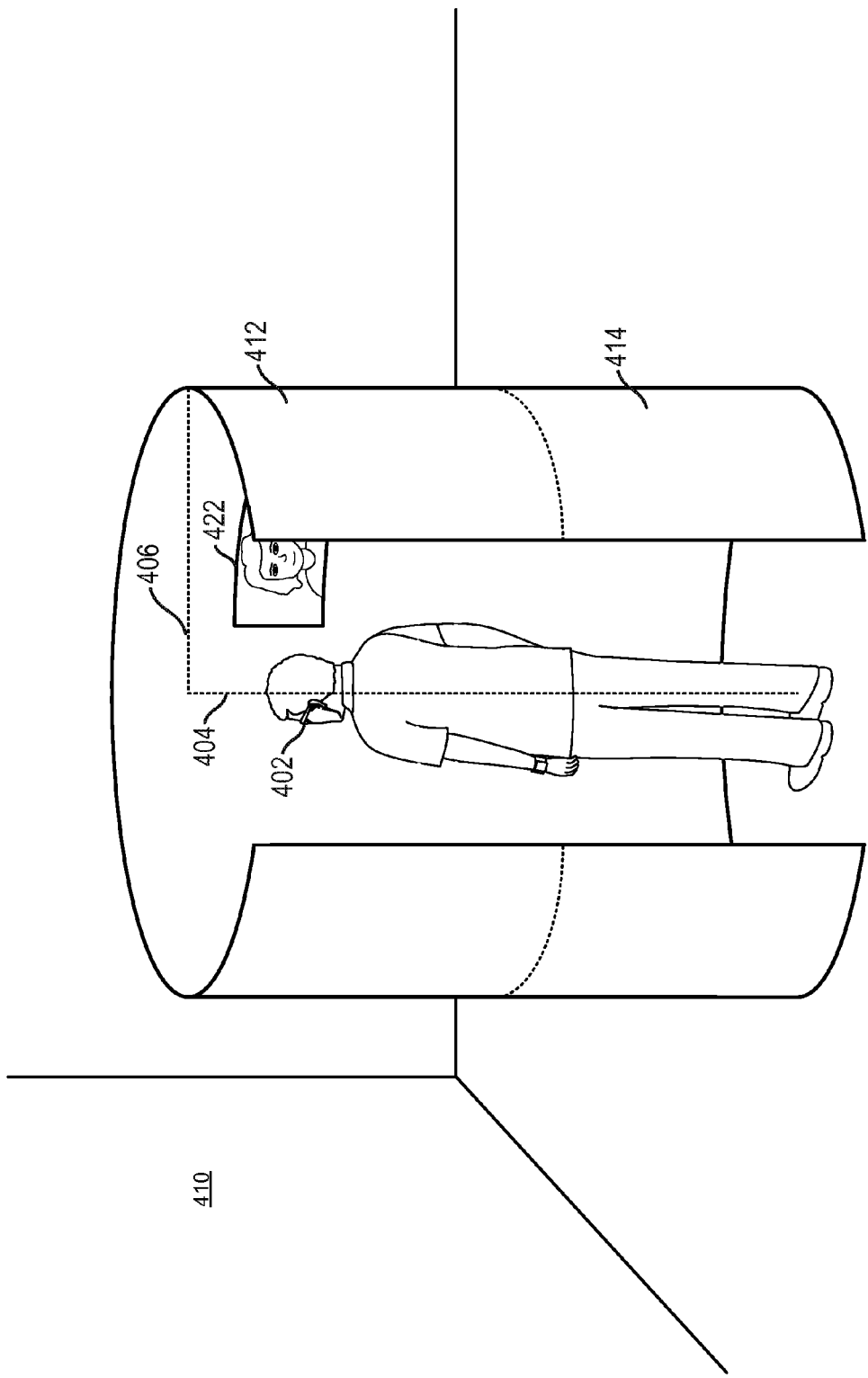
FIG. 4A depicts one embodiment of an augmented reality environment as viewed by an end user of an HMD.

FIG. 4A depicts one embodiment of an augmented reality environment 410 as viewed by an end user of an HMD 402. The HMD 402 may comprise a mobile device, such as mobile device 19 in FIG. 1. The augmented reality environment 410 may include a virtual cylinder surrounding the end user of the HMD 402. The virtual cylinder may comprise an invisible cylinder in which one or more curved slates, such as curved slate 422, are displayed to the end user of the HMD 402. Each of the one or more curved slates may comprise a warped two-dimensional image that displays content to the end user. As depicted, curved slate 422 may display a live video feed to the end user (e.g., a live video call). The virtual cylinder may comprise a top portion 412 of the virtual cylinder and a bottom portion 414 of the virtual cylinder. In one embodiment, an end user of the HMD 402 may be surrounded by and located in the middle of two or more virtual cylinders. In one example, the top portion 412 of the virtual cylinder may comprise a first virtual cylinder surrounding a top portion of the end user and the bottom portion 414 of the virtual cylinder may comprise a second virtual cylinder surrounding a bottom portion of the end user. The virtual cylinder may be associated with a radius 406 and an axis 404. The axis 404 of the virtual cylinder may be located perpendicular to the ground and extend through the end user's torso and head. The location of each of the one or more curved slates within the virtual cylinder may be controlled by the end user using gestures (e.g., hand gestures or head gestures).

In some embodiments, the one or more curved slates may be arranged around the virtual cylinder and appear body-locked relative to a portion of the end user's body. In one example, the one or more curved slates may be body-locked relative to the portion of the end user's body such that the orientation and position of the one or more curved slates arranged on the virtual cylinder appear fixed relative to a front facing portion of the end user's torso. In some embodiments, the end user may move or control the position of a curved slate of the one or more curved slates along the surface of the virtual cylinder using head gestures, hand gestures, and/or voice commands. After being moved and released within the virtual cylinder at a new location, the curved slate may again appear body-locked relative to the portion of the end user's body from the new location.

In some cases, a curved slate, such as curved slate 422, may be generated by warping a two-dimensional image into a curved image that aligns with a surface of the virtual cylinder. In one example, a first two-dimensional image may be mapped into a second two-dimensional image associated with a curved slate via a quadratic image transfer function. The quadratic image transfer function may be used to map a flat two-dimensional image onto a curved surface, such as a portion of a conical, spherical, or cylindrical shape.

In one embodiment, the axis 404 of the virtual cylinder may be determined based on the orientation of a second mobile device attached to the end user's body or placed in a fixed position (or a substantially fixed position) relative to the end user's body. In one example, the second mobile device may be placed in a back pocket of pants worn by the end user or attached to a belt worn around the end user's waist. In this case, the axis 404 of the virtual cylinder may correspond with a gravity vector or a vector that points towards the Earth based on accelerometer and magnetometer data generated by the second mobile device. In another embodiment, the axis 404 of the virtual cylinder may be determined based on images captured by one or more body facing cameras, such as body facing camera 222 in FIG. 2B. The one or more body facing cameras may capture images of the end user's body including the end user's torso, chest, abdomen, or pelvic region. In this case, the axis 404 of the virtual cylinder may correspond with a line that is parallel to a gravity vector generated by an HMD and intersects points on the end user's body identified in the captured images of the end user's body.

Figure 4B:
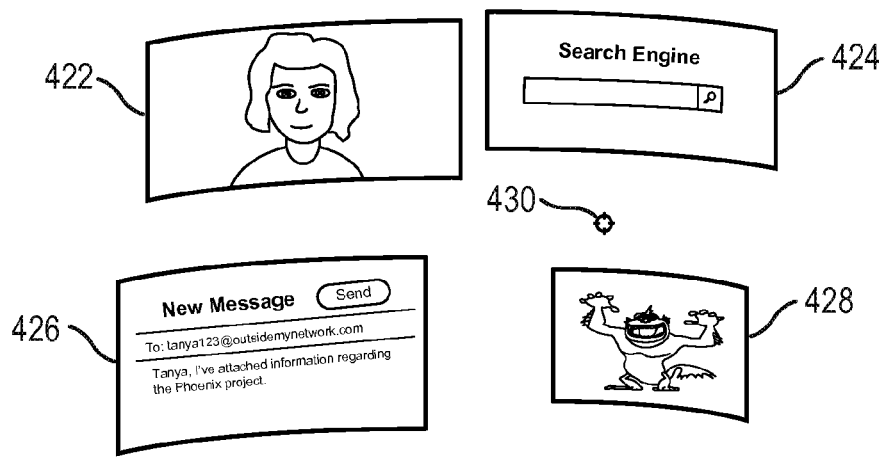
FIG. 4B depicts one embodiment of a set of curved slates that are displayed to an end user of an HMD.

FIG. 4B depicts one embodiment of a set of curved slates that are displayed to an end user of an HMD, such as mobile device 19 in FIG. 1. The set of curved slates may be located on a surface of a virtual cylinder surrounding the end user. The set of curved slates include curved slate 422 (e.g., displaying a live video feed), curved slate 424 (e.g., displaying a search engine interface), curved slate 426 (e.g., displaying an electronic messaging application), and curved slate 428 (e.g., displaying a gaming application). As depicted, a virtual pointer 430 may be used by the end user to select a curved slate for repositioning on a virtual cylinder or to drag the edges or corners of a curved slate to resize the curved slate.

Figure 4C:
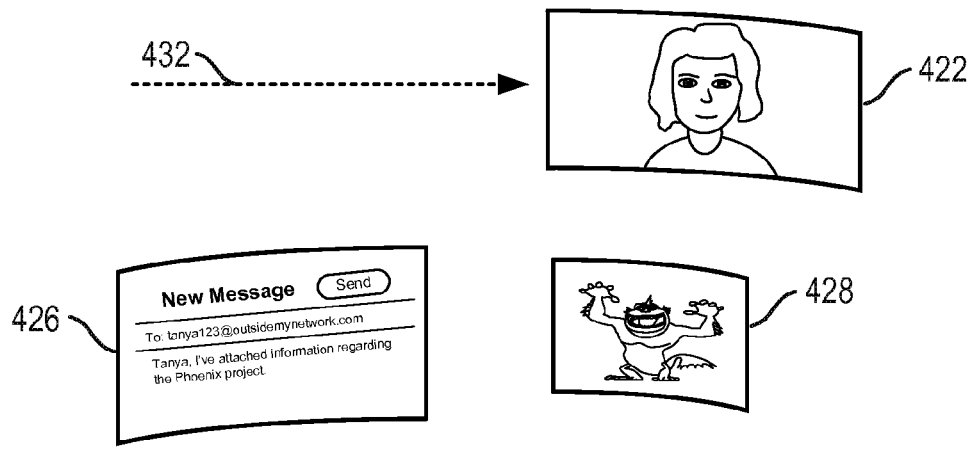
FIG. 4C depicts one embodiment of a repositioning of a curved slate.

FIG. 4C depicts one embodiment of a repositioning of curved slate 422 from FIG. 4B. As depicted, the curved slate 422 has been moved by the end user to a new location that previously displayed curved slate 424 in FIG. 4B. In one example, a hand gesture performed by the end user in the direction 432 of the new location for the curved slate 422 may be used to move the curved slate 422 to the new location. In this case, the curved slate 424 may be automatically moved to a different location within a virtual cylinder to make room for the curved slate 422 or may be automatically pushed back to a secondary virtual cylinder with a greater radius than the virtual cylinder.

Figure 4D:
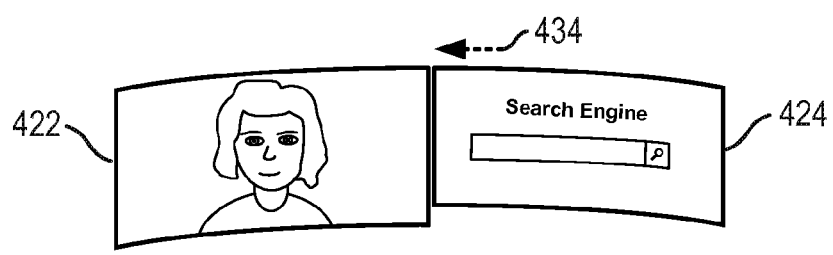
FIG. 4D depicts one embodiment of a magnetic snapping function applied to the location of a curved slate.

FIG. 4D depicts one embodiment of a magnetic snapping function applied to the location of a curved slate. As depicted, the curved slate 424 has been moved by the end user to a new location that is within a particular distance of curved slate 422. Once the curved slate 424 has been released by the end user at the new location, a magnetic snapping function may snap the curved slate 424 in direction 434 to a different location that is aligned with an edge of curved slate 422.

FIG. 4E depicts one embodiment of an augmented reality environment 411 as viewed by an end user of an HMD 402. The HMD 402 may comprise a mobile device, such as mobile device 19 in FIG. 1. The augmented reality environment 411 may include a first virtual cylinder of a first radius surrounding the end user of the HMD 402 and a second virtual cylinder of a second radius greater than the first radius surrounding the end user of the HMD 402. A second curved slate 442 may be arranged on a surface of the second virtual cylinder and be made partially transparent to the end user. A first curved slate 444 may be arranged on a surface of the first virtual cylinder. In one embodiment, the first virtual cylinder may be associated with a work environment and include work-related content (e.g., a live meeting video feed) and the second virtual cylinder may be associated with a home environment and include personal content (e.g., a gaming application). The first radius of the first virtual cylinder may be set based on a location of the end user of the HMD 402. In one example, if the end user is in a GPS location associated with a work environment, then the first radius may be set to two meters and the first virtual cylinder may comprise a primary cylinder that is closest to the end user. Once the end user leaves the GPS location associated with the work environment, then the first radius may be set to ten meters, the second radius may be set to two meters, and the second virtual cylinder may comprise the primary cylinder that is closest to the end user.

Figure 5A:
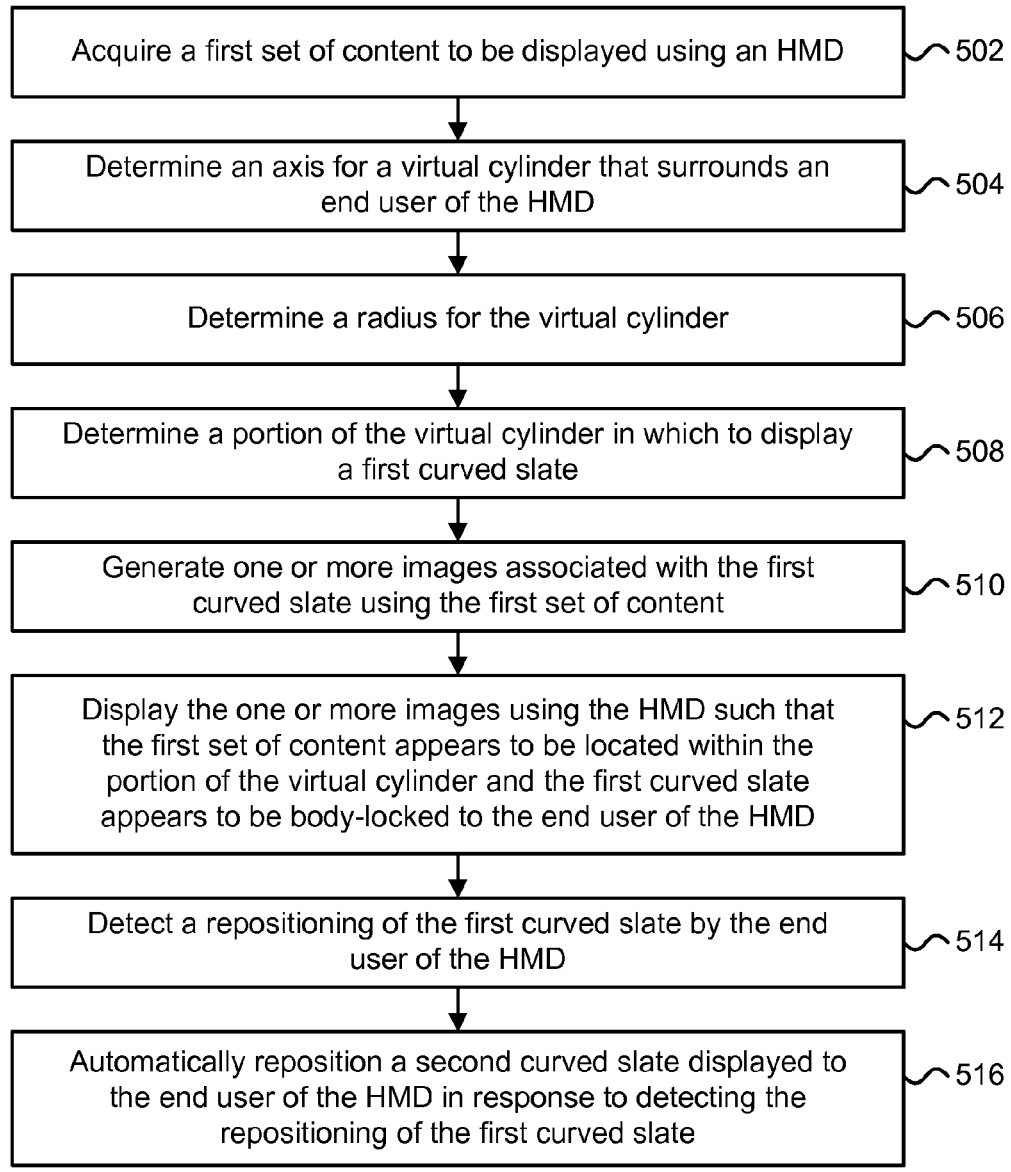
FIG. 5A is a flowchart describing one embodiment of a method for managing content within an interactive augmented reality environment using one or more curved slates.

FIG. 5A is a flowchart describing one embodiment of a method for managing content within an interactive augmented reality environment using one or more curved slates that are positioned on one or more virtual cylinders surrounding an end user of a mobile device. In one embodiment, the process of FIG. 5A may be performed by a mobile device, such as mobile device 19 in FIG. 1.

In step 502, a first set of content to be displayed using an HMD (or another mobile device) is acquired. The first set of content may include images, text, videos, live video feeds, or webpage content. The first set of content may also correspond with content for displaying a user interface associated with a computing application (e.g., an email application, a word processing application, a web browser application, a web-based application, or an instant messaging application). In step 504, an axis for a virtual cylinder that surrounds an end user of the HMD is determined. In one embodiment, the axis of the virtual cylinder may be determined based on an orientation of a second mobile device attached to the end user's body or placed in a fixed position (or a substantially fixed position) relative to the end user's body. In another embodiment, the axis of the virtual cylinder may be determined based on IMU information generated by an IMU of the HMD and images of the end user captured using a body facing camera, such as body facing camera 222 in FIG. 2B. In one example, the axis of the virtual cylinder may correspond with a line that is parallel to a gravity vector generated by the IMU and intersects points on the end user's body identified in captured images of the end user's body.

In step 506, a radius for the virtual cylinder is determined. In some cases, the radius for the virtual cylinder may be set based on a location of the HMD. For example, if the HMD is in a GPS location associated with a work environment, then the radius may be set to two meters. If the HMD is in a GPS location associated with a home environment, then the radius may be set to three meters.

In step 508, a portion of the virtual cylinder in which to display a first curved slate is determined. The portion of the virtual cylinder may comprise a curved region of the virtual cylinder that is bounded by four curved lines that lie within the virtual cylinder. The portion of the virtual cylinder may correspond with a curved region of the virtual cylinder in which the first curved slate may be displayed. The portion of the virtual cylinder in which to display the first curved slate may be determined by a selection by the end user (e.g., the end user may specify an initial location for the first curved slate) or by placing the first curved slate into a pre-defined or default initial location within the virtual cylinder. In step 510, one or more images associated with the first curved slate are generated using the first set of content. In some cases, the one or more images may be generated by warping a two-dimensional image including the first set of content into the one or more images using a quadratic image transfer function that maps the two-dimensional image onto the virtual cylinder. In step 512, the one or more images are displayed using the HMD such that the first set of content appears to be located within the portion of the virtual cylinder and the first curved slate appears to be body-locked to an end user of the HMD.

In step 514, a repositioning of the first curved slate by the end user of the HMD is detected. In step 516, a second curved slate displayed to the end user of the HMD is automatically repositioned in response to detecting the repositioning of the first curved slate. In one embodiment, the end user may perform hand gestures that are recognized by the HMD using gesture recognition in order to reposition the first curved slate. In another embodiment, the first curved slate may be repositioned by the end user using a virtual pointer to select and drag the first curved slate. The first curved slate may also be selected by detecting that the end user has gazed at the first curved slate for at least a threshold period of time (e.g., via gaze detection techniques) and performed a particular head gesture or movement (e.g., a nodding motion) to confirm the selection of the first curved slate.

Figure 5B:
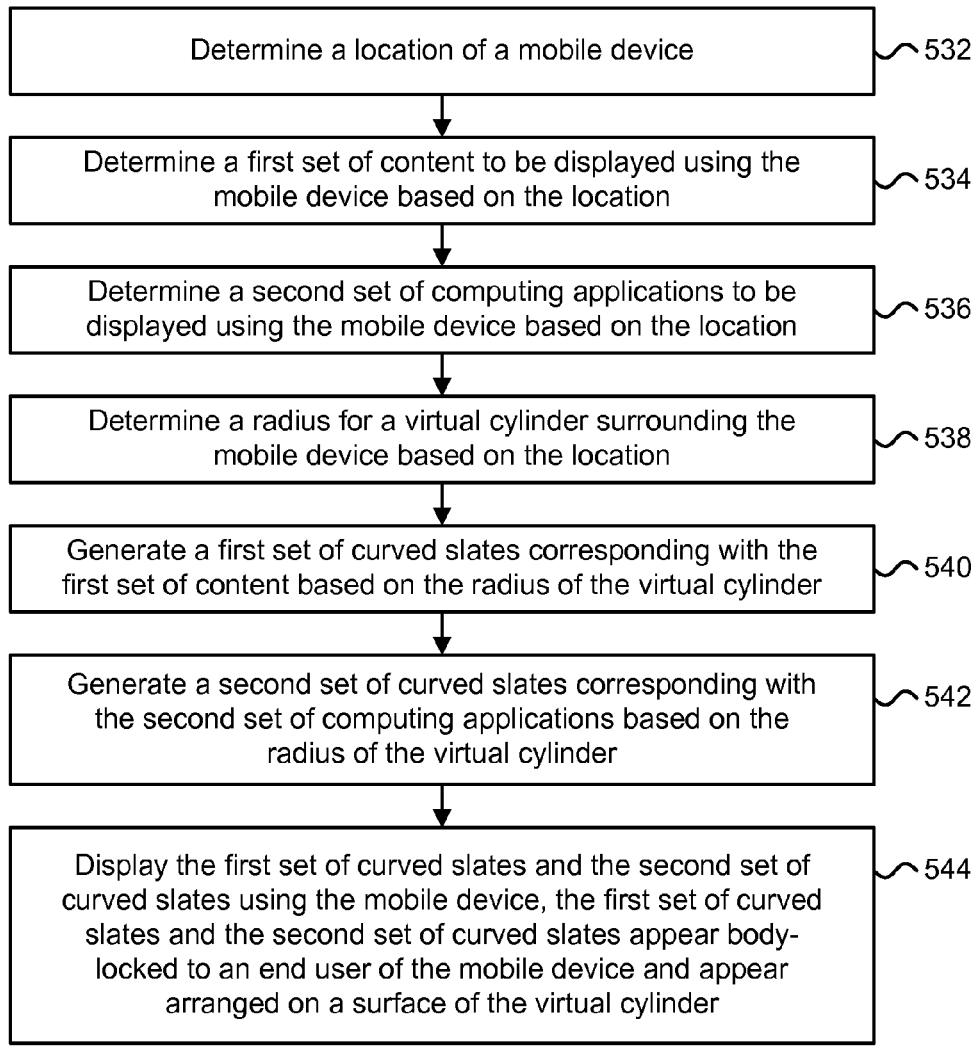
FIG. 5B is a flowchart describing another embodiment of a method for managing content within an interactive augmented reality environment using one or more curved slates.

FIG. 5B is a flowchart describing another embodiment of a method for managing content within an interactive augmented reality environment using one or more curved slates that are positioned on one or more virtual cylinders surrounding an end user of a mobile device. In one embodiment, the process of FIG. 5B may be performed by a mobile device, such as mobile device 19 in FIG. 1.

In step 532, a location of a mobile device is determined. The location of the mobile device may correspond with a GPS location of the mobile device. In step 534, a first set of content to be displayed using the mobile device is determined based on the location. In one example, if the GPS location corresponds with a work environment, then the first set of content may comprise work-related content. In another example, if the GPS location corresponds with a home environment, then the first set of content may comprise home-related content or personal content different from the work-related content.

In step 536, a second set of computing applications to be displayed using the mobile device is determined based on the location. In one example, if the GPS location corresponds with a work environment, then the second set of computing applications may comprise work-related computing applications. In another example, if the GPS location corresponds with a home environment, then the second set of computing applications may comprise personal computing applications different from the work-related computing applications.

In step 538, a radius for a virtual cylinder surrounding the mobile device is determined based on the location. In one example, if the mobile device is in a GPS location associated with a work environment, then the radius may be set to a first distance. If the mobile device is in a GPS location associated with a home environment, then the radius may be set to a second distance greater than or less than the first distance.

In step 540, a first set of curved slates corresponding with the first set of content is generated based on the radius of the virtual cylinder. The radius of the virtual cylinder may determine the distance of the virtual cylinder from the end user of the mobile device and the overall size of the virtual cylinder. The first set of curved slates may be generated by mapping two-dimensional images including the first set of content into the first set of curved slates using a quadratic image transfer function. In step 542, a second set of curved slates corresponding with the second set of computing applications is generated based on the radius of the virtual cylinder. The second set of curved slates may be generated by mapping two-dimensional images including images of user interfaces for the second set of computing application into the first second of curved slates using a quadratic image transfer function. In step 544, the first set of curved slates and the second set of curved slates are displayed using the mobile device. The first set of curved slates and the second set of curved slates may appear body-locked to an end user of the mobile device and appear arranged on a surface of the virtual cylinder.

Figure 5C:
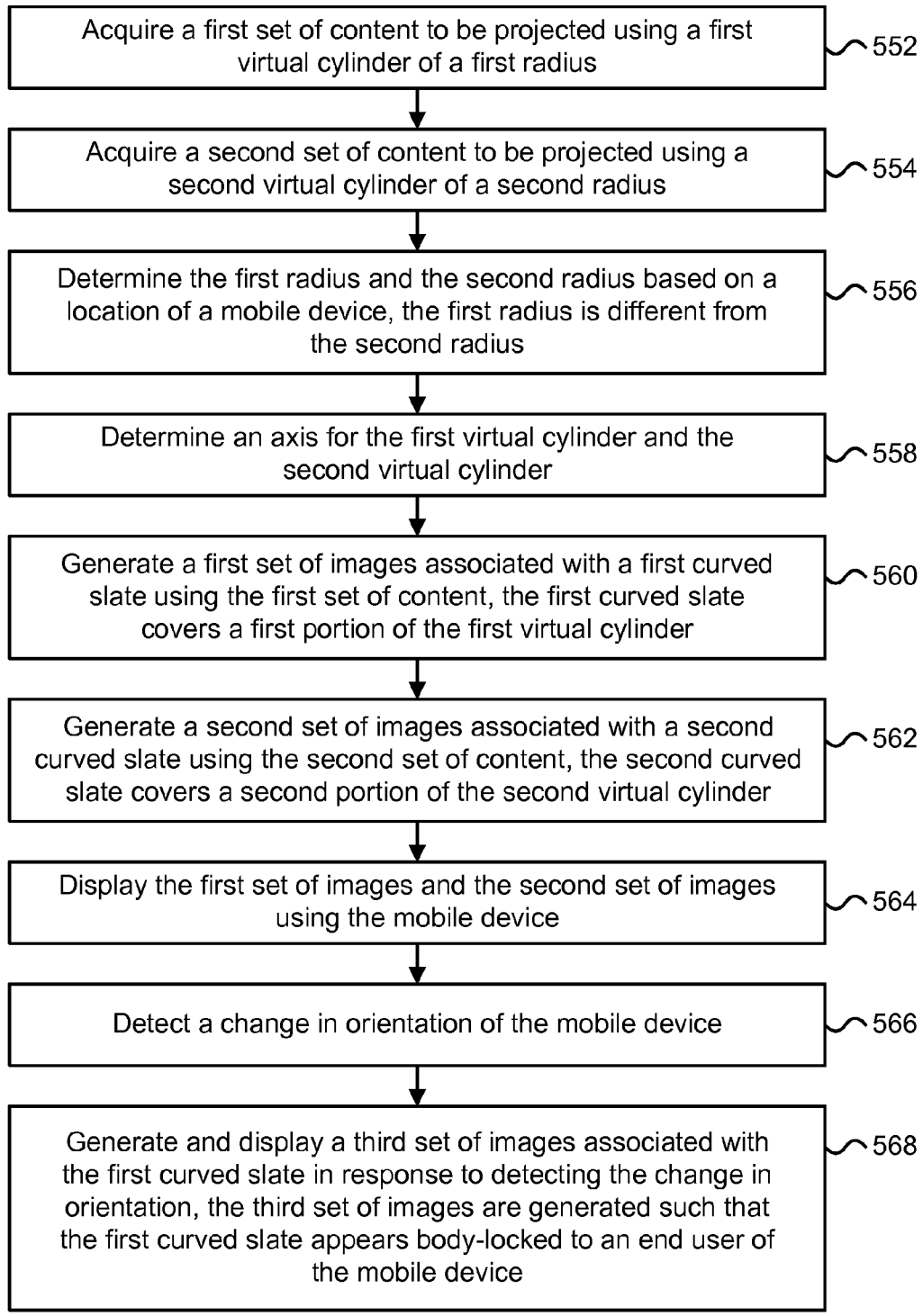
FIG. 5C is a flowchart describing an alternative embodiment of a method for managing content within an interactive augmented reality environment using one or more curved slates that are positioned on one or more virtual cylinders surrounding an end user of a mobile device.

FIG. 5C is a flowchart describing an alternative embodiment of a method for managing content within an interactive augmented reality environment using one or more curved slates that are positioned on one or more virtual cylinders surrounding an end user of a mobile device. In one embodiment, the process of FIG. 5C may be performed by a mobile device, such as mobile device 19 in FIG. 1.

In step 552, a first set of content to be projected using a first virtual cylinder of a first radius is acquired. In step 554, a second set of content to be projected using a second virtual cylinder of a second radius is acquired. In one embodiment, the first virtual cylinder may be associated with a work environment and include work-related content (e.g., an email reader, a word processing document, a video, or a live meeting feed) and the second virtual cylinder may be associated with a home environment and include personal content (e.g., a television show or movie, webpages associated with sporting events, a search engine interface, or an instant messaging client).

In step 556, the first radius and the second radius are determined based on a location of a mobile device. The first radius may be assigned a different value or a different length than the second radius (e.g., the first radius may be assigned a value that is less than the value assigned to the second radius). In one embodiment, the location of the mobile device may determine whether the first virtual cylinder or the second virtual cylinder is the primary virtual cylinder with the smallest radius. In one example, if the location of the mobile device corresponds with a work environment, then the virtual cylinder associated with the work environment may comprise the primary virtual cylinder and be assigned the smallest radius out of two or more virtual cylinders surrounding the mobile device. In another example, if the mobile device is located outside of a work environment (e.g., per GPS coordinates the mobile device is determined to be located outside of a geographic location associated with the work environment), then the virtual cylinder associated with a home environment may comprise the primary cylinder and be assigned the smallest radius out of two or more virtual cylinders surrounding the end user.

In step 558, an axis for the first virtual cylinder and the second virtual cylinder is determined. The axis may comprise a common axis used by both the first virtual cylinder and the second virtual cylinder. In one embodiment, the axis for the first virtual cylinder and the second virtual cylinder may be determined based on an orientation of a second mobile device attached to the end user's body or placed in a fixed position (or a substantially fixed position) relative to the end user's body. In another embodiment, the axis for the first virtual cylinder and the second virtual cylinder may be determined based on IMU information generated by an IMU of the HMD and images of the end user captured using a body facing camera, such as body facing camera 222 in FIG. 2B. In one example, the axis for the first virtual cylinder and the second virtual cylinder may correspond with a line that is parallel to a gravity vector generated by the IMU and intersects points on the end user's body identified in captured images of the end user's body.

In step 560, a first set of images associated with a first curved slate is generated using the first set of content. The first curved slate may cover a first portion of the first virtual cylinder. The first curved slate may be generated by mapping a first image displaying the first set of content into a second image associated with the first curved slate via a quadratic image transfer function. In step 562, a second set of images associated with a second curved slate is generated using the second set of content. The second curved slate may cover a second portion of the second virtual cylinder. The second curved slate may be generated by mapping a third image displaying the second set of content into a fourth image associated with the second curved slate via a quadratic image transfer function. In step 564, the first set of images and the second set of images are displayed using the mobile device. In some cases, the mobile device may comprise an HMD. In step 566, a change in orientation of the mobile device is detected. In step 568, a third set of images associated with the first curved slate is generated and displayed in response to detecting the change in orientation. The third set of images is generated such that the first curved slate appears body-locked to an end user of the mobile device.

In some embodiments, the mobile device may dynamically adjust the first radius of the first virtual cylinder and the second radius of the second virtual cylinder based on a location of the mobile device. In one example, as the mobile device moves from being within a work environment to being outside of the work environment, the mobile device may adjust the first radius and the second radius such that the first radius is less than the second radius when the mobile device is within the work environment and the first radius is greater than the second radius when the mobile device is outside of the work environment. In some cases, a mapping table stored on the mobile device may be used to determine the first radius and the second radius based on the location of the mobile device.

In some embodiments, the mobile device may dynamically adjust a radius of a virtual cylinder based on a number of curved slates that are displayed within the virtual cylinder. In one example, the radius of the virtual cylinder may be set to a first radius given that the number of curved slates displayed within the virtual cylinder is below a threshold number of curved slates displayed. Upon detection that the number of curved slates to be displayed will be above the threshold number of curved slates, the mobile device may set the radius of the virtual cylinder to a second radius that is greater than the first radius. In some cases, upon detection that the number of curved slates to be displayed will be above the threshold number of curved slates, the mobile device may add a second virtual cylinder and assign one or more curved slates from the virtual cylinder to the second virtual cylinder.

In some embodiments, the mobile device may dynamically adjust a radius of a virtual cylinder based on a number of slate overlaps of curved slates within the virtual cylinder. Two curved slates may overlap if the areas of the two curved slates as displayed using the mobile device overlap. In one example, the radius of the virtual cylinder may be set to a first radius given that the number of slate overlaps displayed within the virtual cylinder is below a threshold number of overlaps. Upon detection that the number of slate overlaps is above the threshold number of overlaps, the mobile device may set the radius of the virtual cylinder to a second radius that is greater than the first radius. In some cases, upon detection that the number of slate overlaps is above the threshold number of slate overlaps, the mobile device may add a second virtual cylinder and assign one or more curved slates from the virtual cylinder to the second virtual cylinder.

One embodiment of the disclosed technology includes one or more processors in communication with a see-through display. The one or more processors acquire a first set of content, determine an axis for a first virtual cylinder that surrounds an end user of the electronic device, determine a radius for the first virtual cylinder, generate one or more images associated with a first curved slate using the first set of content, and cause the one or more images to be displayed using the see-through display such that the first curved slate appears to be located within a portion of the first virtual cylinder and the first curved slate appears to be body-locked to the end user of the electronic device.

One embodiment of the disclosed technology includes a method for managing content within an interactive augmented reality environment using a mobile device including determining a first set of content to be displayed using the mobile device, determining an axis for a first virtual cylinder that surrounds an end user of the mobile device, determining a radius for the first virtual cylinder, generating one or more images associated with a first curved slate using the first set of content, and displaying the one or more images using the mobile device such that the first curved slate appears to be located within a portion of the first virtual cylinder and the first curved slate appears to be body-locked to the end user of the mobile device. In some cases, the method may further comprise determining a location of the mobile device and determining the radius based on the location. In some embodiments, the method may further comprise acquiring a second set of content, determining a second radius for a second virtual cylinder that surrounds the end user of the mobile device, determining a second portion of the second virtual cylinder in which to display a second curved slate, generating one or more other images associated with the second curved slate using the second set of content, and displaying the one or more other images using the mobile device such that the second curved slate appears to be located within the second portion of the second virtual cylinder and the second curved slate appears to be body-locked to the end user of the mobile device. The method may further comprise dynamically adjusting the radius of the first virtual cylinder and the second radius of the second virtual cylinder based on a location of the mobile device. The mobile device may comprise a head-mounted display device One embodiment of the disclosed technology includes determining a location of the mobile device, determining a first set of content to be displayed based on the location of the mobile device, determining an axis for a first virtual cylinder that surrounds an end user of the mobile device, determining a radius for the first virtual cylinder based on the location of the mobile device, generating one or more images associated with a first curved slate using the first set of content, and displaying the one or more images using a see-through display of the mobile device such that the first curved slate appears to be located within a portion of the first virtual cylinder and the first curved slate appears to be body-locked to the end user of the mobile device.

Figure 6:
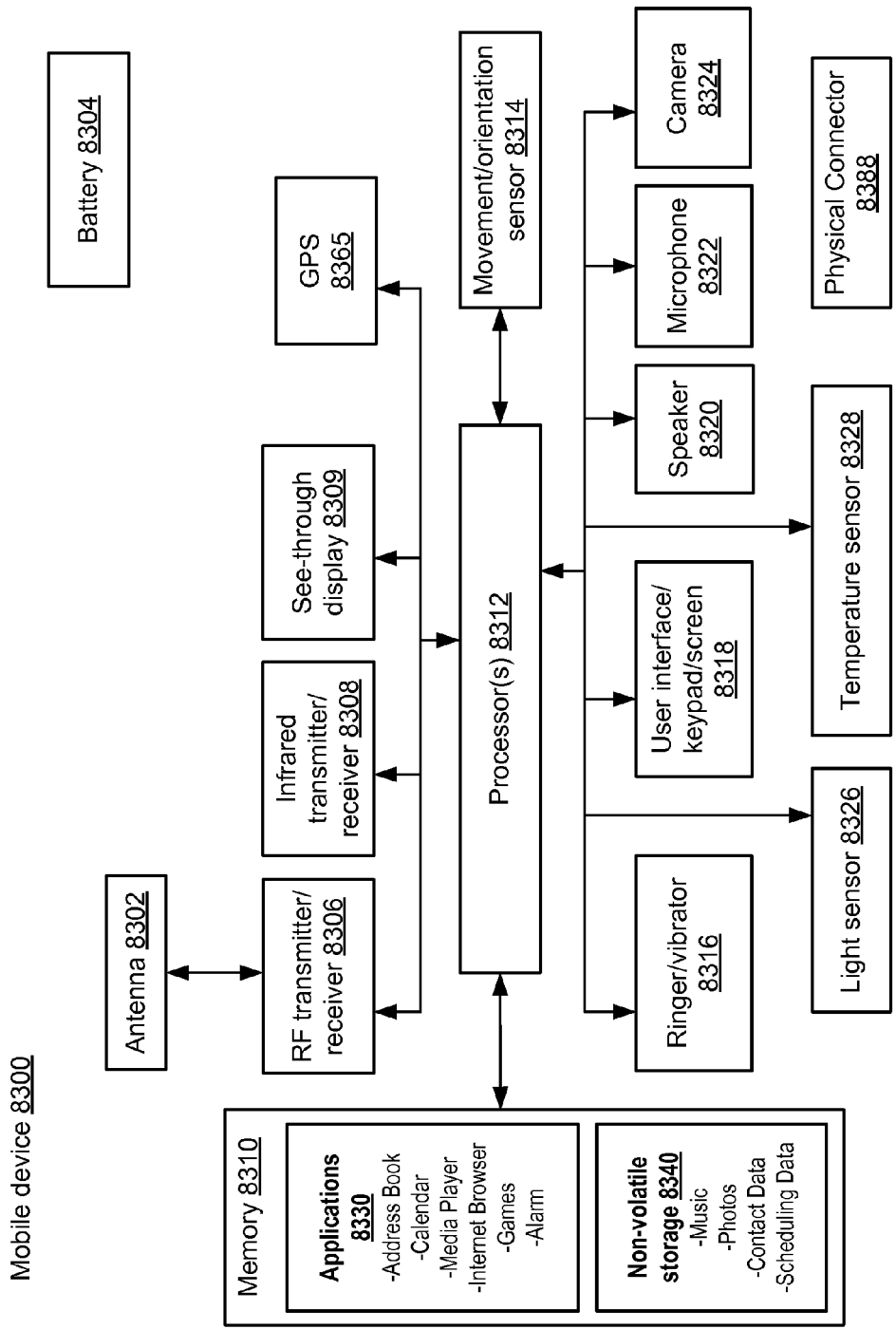
FIG. 6 is a block diagram of one embodiment of a mobile device.

FIG. 6 is a block diagram of one embodiment of a mobile device 8300, such as mobile device 19 in FIG. 1. Mobile devices may include laptop computers, pocket computers, mobile phones, HMDs, personal digital assistants, and hand-held media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic device that provides an interactive augmented reality environment, comprising:
a see-through display; and
one or more processors configured to acquire a first set of content and a second set of content, the one or more processors configured to determine a first GPS location of the electronic device at a first point in time, the one or more processors configured to determine a first radius for a first virtual cylinder that surrounds an end user of the electronic device based on the first GPS location and determine a second radius for a second virtual cylinder that surrounds the end user of the electronic device based on the first GPS location, wherein the first radius is greater than the second radius, the one or more processors configured to adjust the first radius for the first virtual cylinder and the second radius for the second virtual cylinder based on a second GPS location of the electronic device in response to determining the second GPS location of the electronic device at a second point in time subsequent to the first point in time, wherein the second radius is greater than the first radius, the see-through display configured to display a first set of content within a portion of the first virtual cylinder at the adjusted first radius such that the first set of content appears to be body-locked to the end user of the electronic device and display a second set of content within a portion of the second virtual cylinder at the adjusted second radius such that the second set of content appears to be body-locked to the end user of the electronic device.

2. The electronic device of claim 1, wherein:
the one or more processors configured to determine the first radius for the first virtual cylinder based on a number of curved slates that are displayed within the first virtual cylinder.

3. The electronic device of claim 1, wherein:
the one or more processors configured to generate one or more other images associated with a second curved slate using the second set of content, the one or more processors configured to cause the one or more other images to be displayed using the see-through display such that the second curved slate appears to be body-locked to the end user of the electronic device.

4. The electronic device of claim 1, wherein:
the one or more processors configured to dynamically adjust the first radius of the first virtual cylinder and the second radius of the second virtual cylinder based on a GPS location of the electronic device.

5. The electronic device of claim 1, wherein:
the one or more processors configured to detect a repositioning of a first curved slate by the end user of the electronic device and automatically reposition a second curved slate displayed to the end user of the electronic device in response to detecting the repositioning of the first curved slate.

6. The electronic device of claim 5, wherein:
the one or more processors configured to assign the second curved slate to the second virtual cylinder in response to detecting the repositioning of the first curved slate.

7. The electronic device of claim 1, wherein:
the one or more processors configured to determine an axis for the first virtual cylinder using a gravity vector generated by a second mobile device that is attached to a torso of the end user; and the electronic device comprise a head-mounted display device.

8. A method for managing content within an interactive augmented reality environment using a mobile device, comprising:
determining a first set of content and a second set of content to be displayed using the mobile device;
determining a first GPS location of the mobile device at a first point in time;
determining a first radius for a first virtual cylinder that surrounds an end user of the mobile device based on the first GPS location of the mobile device and determining a second radius for a second virtual cylinder that surrounds the end user of the mobile device based on the first GPS location of the mobile device, wherein the first radius is greater than the second radius;
adjusting the first radius for the first virtual cylinder and the second radius for the second virtual cylinder based on a second GPS location of the mobile device in response to determining the second GPS location of the mobile device at a second point in time subsequent to the first point in time, wherein the second radius is greater than the first radius; and
displaying the first set of content within a portion of the first virtual cylinder at the adjusted first radius such that the first set of content appears to be body-locked to the end user of the mobile device and displaying the second set of content within a portion of the second virtual cylinder at the adjusted second radius such that the second set of content appears to be body-locked to the end user of the mobile device.

9. The method of claim 8, wherein:
the determining the first radius for the first virtual cylinder includes determining the first radius for the first virtual cylinder based on a number of curved slates that are displayed within the first virtual cylinder.

10. The method of claim 8, wherein:
the determining the first set of content includes determining the first set of content based on the first GPS location.

11. The method of claim 8, further comprising:
generating one or more other images associated with a second curved slate using the second set of content; and
displaying the one or more other images using the mobile device such that the second curved slate appears to be located within the second portion of the second virtual cylinder and the second curved slate appears to be body-locked to the end user of the mobile device.

12. The method of claim 8, further comprising:
dynamically adjusting the first radius of the first virtual cylinder based on a number of slate overlaps of curved slates that are displayed within the first virtual cylinder.

13. The method of claim 8, further comprising:
generating one or more images associated with a first curved slate using the first set of content;
displaying the one or more images using the mobile device such that the first curved slate appears to be located within a portion of the first virtual cylinder and the first curved slate appears to be body-locked to the end user of the mobile device;
detecting a repositioning of the first curved slate by the end user of the mobile device; and
automatically repositioning a second curved slate displayed to the end user of the mobile device in response to detecting the repositioning of the first curved slate.

14. The method of claim 13, wherein:
the automatically repositioning a second curved slate includes assigning the second curved slate from the first virtual cylinder to the second virtual cylinder.

15. The method of claim 13, wherein:
the detecting a repositioning of the first curved slate includes detecting a head gesture performed by the end user of the mobile device.

16. The method of claim 8, further comprising:
determining an axis for the first virtual cylinder based on a gravity vector generated by a second mobile device that is attached to a torso of the end user.

17. The method of claim 8, further comprising:
determining an axis for the first virtual cylinder, the mobile device includes a body facing camera, the determining the axis for the first virtual cylinder includes determining the axis based on images of a torso of the end user captured using the body facing camera.

18. The method of claim 8, wherein:
the mobile device comprises a head-mounted display device.

19. One or more storage devices containing processor readable code for programming one or more processors to perform a method for managing content within an interactive augmented reality environment using a mobile device comprising the steps of:
determining a first GPS location of the mobile device at a first point in time;
determining a first radius for a first virtual cylinder that surrounds an end user of the mobile device based on the first GPS location of the mobile device and determining a second radius for a second virtual cylinder that surrounds the end user of the mobile device based on the first GPS location of the mobile device, wherein the first radius is greater than the second radius;
adjusting the first radius for the first virtual cylinder and the second radius for the second virtual cylinder based on a second GPS location of the mobile device in response to determining the second GPS location of the mobile device at a second point in time subsequent to the first point in time, wherein the second radius is greater than the first radius; and
displaying a first set of content within a portion of the first virtual cylinder at the adjusted first radius such that the first set of content appears to be body-locked to the end user of the mobile device and displaying a second set of content within a portion of the second virtual cylinder at the adjusted second radius such that the second set of content appears to be body-locked to the end user of the mobile device.

* * * * *